United States Patent [19]
Gäb

[11] Patent Number: 6,029,960
[45] Date of Patent: Feb. 29, 2000

[54] HYDRAULICALLY DAMPING ELASTIC BEARING

[75] Inventor: Gerd Gäb, Ahrweiler, Germany

[73] Assignee: Boge GmbH, Bonn, Germany

[21] Appl. No.: 08/939,904

[22] Filed: Sep. 29, 1997

[30] Foreign Application Priority Data

Oct. 1, 1996 [DE] Germany .......................... 196 40 531

[51] Int. Cl.[7] ...................................................... F16F 5/00
[52] U.S. Cl. .................... 267/140.12; 267/141.4
[58] Field of Search ........................ 267/140.12, 141.2, 267/141.3, 141.4, 140.2, 293

[56] References Cited

U.S. PATENT DOCUMENTS

| | | | |
|---|---|---|---|
| 4,667,942 | 5/1987 | Bitchkus et al. | 267/140.12 |
| 4,700,934 | 10/1987 | Andra et al. | 267/140.12 |
| 5,096,166 | 3/1992 | Schwerdt | 267/140.12 |
| 5,288,059 | 2/1994 | Gautheron et al. | 267/141.2 |
| 5,509,643 | 4/1996 | Carstens et al. | 267/140.12 |

FOREIGN PATENT DOCUMENTS

| | | |
|---|---|---|
| 2755117 | 6/1979 | Germany . |
| 3818287 | 12/1989 | Germany . |

*Primary Examiner*—Mark T. Le
*Assistant Examiner*—Robert A. Siconolfi
*Attorney, Agent, or Firm*—Nils H. Ljungman & Associates

[57] ABSTRACT

An hydraulically damping elastic bearing having an inner part or tube and an outer tube located concentrically or eccentrically in relation to the inner tube. The outer tube is located at some distance from the inner tubes The hydraulically damping elastic bearing also has a rubber part inserted between the inner tube and outer tube. In the rubber part there is at least one chamber which is filled with damping fluid. Outside the chamber there is at least one elastic stop body which extends radially between the inner part and the outer tube and is directly or indirectly connected to the outer tube.

19 Claims, 3 Drawing Sheets

HYDRAULICALLY DAMPING ELASTIC BEARING

BACKGROUND OF THE INVENTION

1. Field of the Invention

The present invention relates generally to an hydraulically damping rubber or elastic bearing which includes an inner part or tube and an outer tube which is located concentrically or eccentrically in relation to the inner tube. The outer tube is located at some distance from the inner tube. The hydraulically damping elastic bearing also includes a rubber part which is inserted between the inner tube and the outer tube. In the rubber part there is at least one chamber which is filled with damping fluid.

2. Background Information

Rubber bearings are generally known (e.g. German Patent No. 27 55 117) which consist of an outer bearing sleeve and an inner part which is held inside by an elastomer body, whereby the elastomer body, above and below the inner part, has recesses which function as a spring travel chamber. In this embodiment, no provision is made for hydraulic damping by damping medium. The metal inner part is provided on one of the outer sides adjacent to the recesses with a recess which runs in the longitudinal direction and in which an elastic stop body is inserted.

Furthermore, hydraulically damping rubber bearings are generally known (e.g. German Patent No. 38 18 287 corresponding to U.S. Pat. No. 4,958,811), in which stop bodies are provided outside the chamber which is filled with the damping medium. These stop bodies are attached to the radially inner part and work together with a shoulder of the rubber part. In this case, there must be an appropriate geometry of the stop body and of the rubber part which forms the chambers.

OBJECT OF THE INVENTION

The object of the present invention is to create an hydraulically damping rubber or elastic bearing which can be provided in an economical manner with different biases or pre-stresses in different applications or ranges of operation.

SUMMARY OF THE INVENTION

The present invention teaches that this object can be accomplished in accordance with at least one preferred embodiment, by locating at least one elastic stop body outside the chamber. The stop body extends radially between the inner part and the outer tube and is directly or indirectly connected to the outer tube.

According to an additional preferred characteristic, the stop body is located on a ring-shaped component. The ring-shaped component is held inside the outer tube with or by means of its outside diameter.

In other words and in accordance with another possible embodiment of the present invention, the ring-shaped component can be designed or sized to press against the inner diameter of the outer tube when the ring-shaped component is inserted into the outer tube. The ring-shaped component can also be designed to fit snugly or tight against the inner diameter of the outer tube when the ring-shaped component is inserted into the outer tube. By being in contact with the inner diameter of the outer tube, the ring-shaped component, with the stop bodies, can be held in a substantially fixed position within the outer tube.

One advantage of this embodiment is that the stop bodies, together with the ring-shaped component, can be used in various applications, so that by applying different biases or pre-stresses, a single standard rubber bearing can be used for many different purposes by varying the stop bodies.

In other words and in accordance with another possible embodiment of the present invention, different stop bodies can be used in combination with the ring-shaped component. The different stop bodies can have different characteristics, which, in turn, can cause the hydraulically damping elastic bearing to have different characteristics when the ring-shaped component and stop bodies are inserted into the outer tube. The ring-shaped component with the preselected stop bodies can then be inserted into a standard rubber or elastic bearing to give the standard elastic bearing the desired damping characteristics. By being able to change the damping characteristics of a standard elastic bearing by inserting a ring-shaped component with a chosen stop body, the standard elastic bearing can be used for a variety of different purposes. Also, the manufacture and assembly of other devices using elastic bearings can be simplified because instead of having to use a different elastic bearing for each different situation, a standard elastic bearing can be used with different stop bodies in the ring-shaped component to obtain the same characteristics.

In an additional embodiment, the two stop bodies are provided diametrically opposite one another.

To achieve a correct adherence of the stop body to the corresponding ring-shaped component, the present invention teaches that the ring-shaped component is provided with at least one recess in the area in which the stop body is located or seated.

In an additional embodiment, the stop body is made of rubber-elastomer material or plastic, or a material which is similar to plastic.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below, with reference to the embodiments illustrated in the accompanying drawings, wherein.

DESCRIPTION OF THE PREFERRED EMBODIMENT

Figure 1:
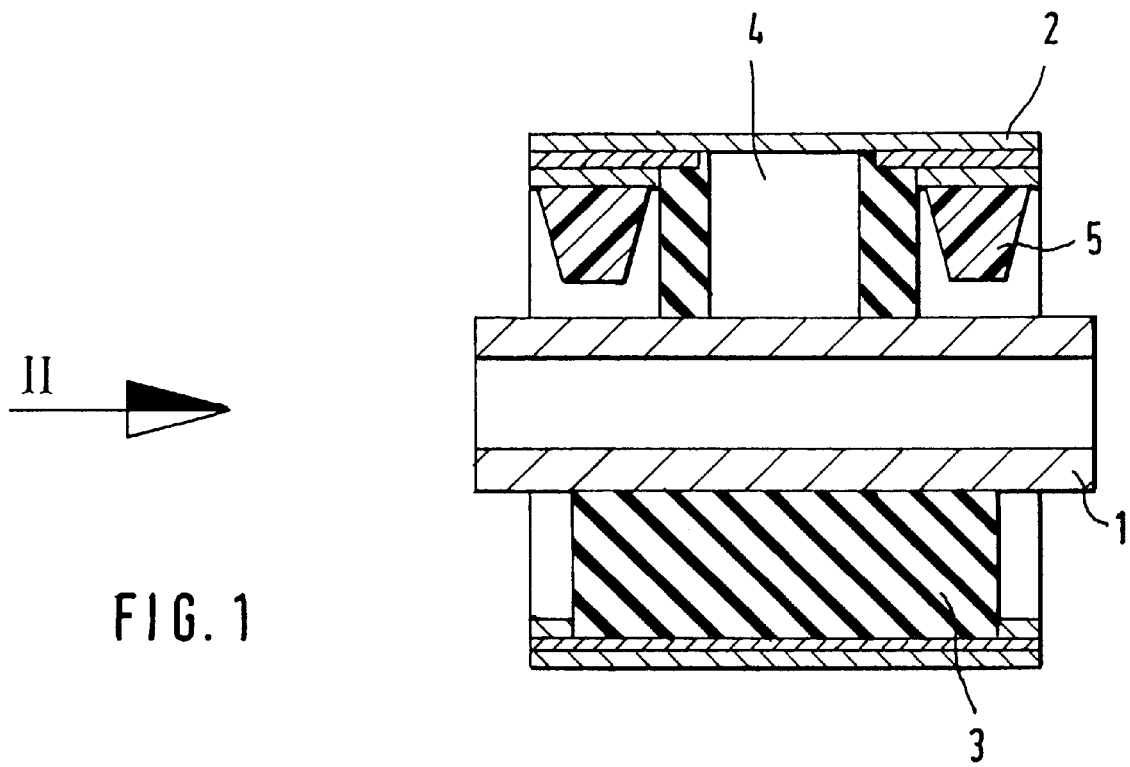
FIGS. 1 and 2 show an hydraulically damping rubber bearing in sectional view, with two stop bodies.

The hydraulically damping rubber or elastic bearing illustrated in FIG. 1 can include an inner part or tube 1 and an outer tube 2 located concentric to the inner part 1. A rubber or elastic part 3 may be inserted between the inner tube 1 and the outer tube 2. The rubber part 3 can also have chambers 4 which may be filled with damping medium. The chambers 4 filled with damping medium are preferably hydraulically connected to one another. The rubber part 3 is preferably permanently connected to both the inner part 1 and an intermediate part 9. The connection to the inner tube 1, for example, can be made by means of vulcanization, and the connection to the outer tube 2 can be made by means of metal rings.

Figure 7:
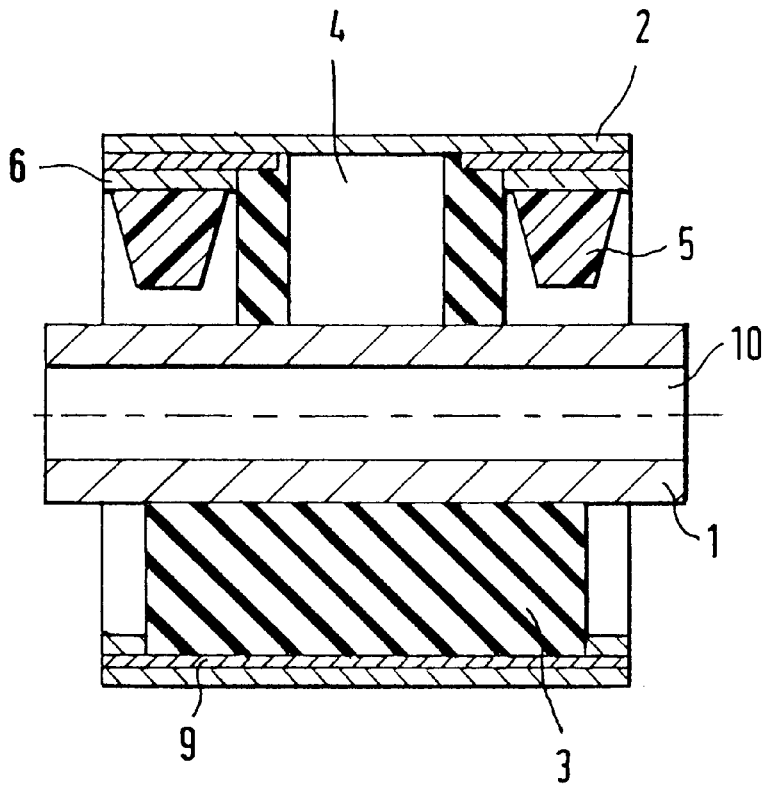
FIGS. 7 and 8 show additional features of the hydraulically damping rubber bearing illustrated in FIGS. 1 and 2.
Figure 8:
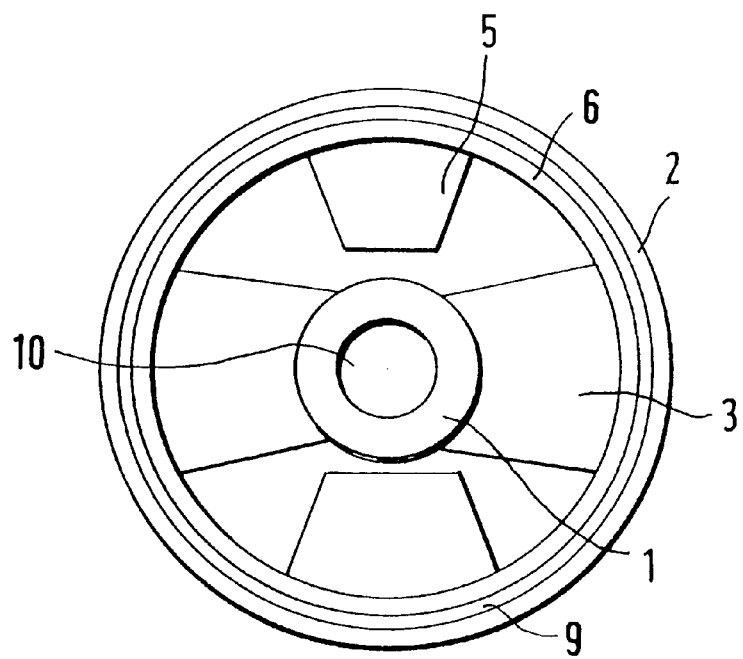

In accordance with another possible embodiment of the present invention, the inner part 1 can have a central axis (see FIG. 7). The inner part 1 can be either concentric or off-center with respect to the outer tube 2. The rubber or elastic part 3 can be connected to the inner part 1 by vulcanization, adhesion or any other suitable procedure. The rubber or elastic part 3 can be connected to an intermediate part 9 (see FIGS. 7 and 8) located near the outer tube 2. The intermediate part 9 can be in the form of a metal ring or any other rigid body.

Figure 2:
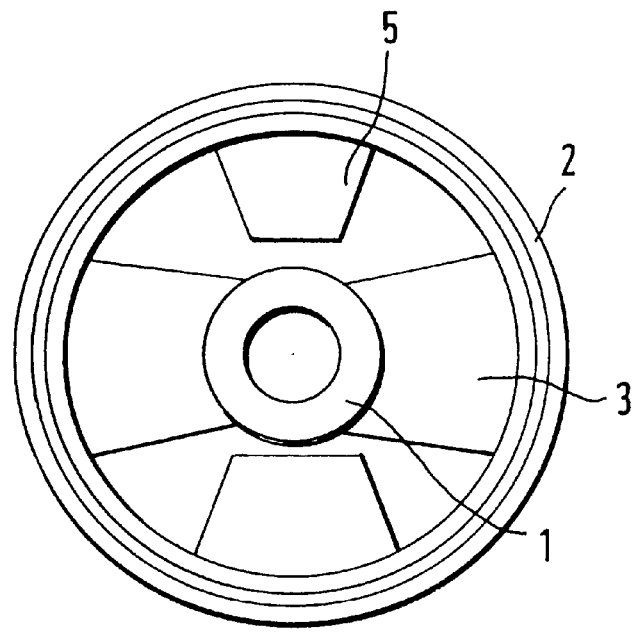

The hydraulically damping rubber or elastic bearing illustrated in FIGS. 1 and 2 preferably has, outside the chamber 4, stop bodies 5. The stop bodies 5 can be located on both end surfaces of the rubber or elastic bearing. The stop bodies 5 can thereby be fastened with respect to the outer tube 2 by means of a ring-shaped component 6 (see FIGS. 7 and 8). The stop bodies 5 can extend radially inward toward the inner part 1. The corresponding stop and damping conditions are preferably achieved by allowing an appropriate distance between the stop body 5 and the inner part 1, and by the selection of the material of which the stop body 5 is made.

In accordance with another possible embodiment of the present invention, the stop bodies 5 can be positioned near each axial end of the rubber or elastic bearing. Furthermore, the stop position and the damping conditions of the rubber or elastic bearing may be determined by the type and size of the stop bodies 5 used in the rubber or elastic bearing.

The inner part 1 can be provided with a central boring which central boring can guarantee the seating of the inner part 1 on a neighboring component (not shown). The outer tube 2 can thereby provide the seating in a corresponding boring of an additional neighboring component (not shown).

In accordance with another possible embodiment of the present invention, the inner part 1 can have a central boring 10 (see FIGS. 7 and 8) about the central axis. The central boring 10 can be used for the mounting of the rubber or elastic bearing on a neighboring component.

Figure 3:
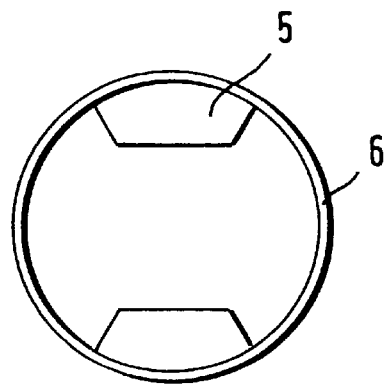
FIGS. 3 to 6 show a stop body together with a ring-shaped component, as a detail.
Figure 4:

FIGS. 3 and 4 show two views of the stop body 5 together with the ring-shaped component 6 as a separate component. The ring-shaped component 6 is preferably realized in the form of an encircling component, e.g. a component which is cut from sheet metal and welded together to form a ring-shaped component. Stop bodies 5 can be fastened diametrically opposite to one another on the ring-shaped component 6. The stop body 5, as shown in FIG. 6, can be buttoned into a recess 7, or when rubber-elastomer parts are used, the two parts can be non-detachably vulcanized to one another.

Figure 5:
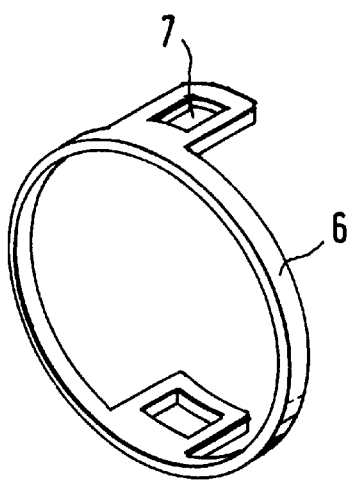

FIG. 5 shows a ring-shaped component 6 as a single part, whereby as a function of the geometry of the rubber part 3 illustrated in FIG. 1, the ring-shaped component 6 can have an appropriate geometry which efficiently utilizes the space available in the rubber bearing. The two larger parts in terms of their surface area are designed to hold the stop body 5, while the corresponding thin encircling parts are designed to press the ring-shaped component 6 into the outer tube 2.

In accordance with another possible embodiment of the present invention, the ring-shaped component 6 can have a shape that, when used in combination with the rubber or elastic part 3, can produce an efficient use of the space within the rubber or elastic bearing. The ring-shaped component 6 can preferably include a narrow ring portion and portions which project away from the narrow ring. The narrow ring can be used to hold the ring-shaped component 6 inside the outer tube 2. The portions protecting from the ring-shaped component 6, because of their larger size, can be used to hold the stop bodies 5.

Figure 6:
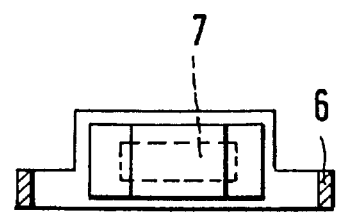

During the vulcanization of the stop body 5, the recess 7 illustrated in FIG. 6 in the ring-shaped component 6 can act as a correspondingly large connection surface between the ring-shaped component 6 and the stop body 5. It is altogether conceivable that the recess in the stop body 5 can be made of plastic materials, rubber-elastomer compounds, hard rubber or metal.

In accordance with another possible embodiment of the present invention, the portion of the ring shaped component 6 that forms the recess 7 and the connection surface between the ring-shaped component 6 and the stop bodies 5 can be made from plastic materials, rubber-elastomer compounds, hard rubber or metal.

In another possible embodiment of the present invention, the inner tube 1 can be mounted on a shaft or bolt (not shown) and the outer tube 2 can have mountings for attachment to a component of a motor vehicle (not shown). The rubber or elastic bearing can preferably be used to dampen the vibrations between the shaft connected to the inner tube 1 and the component connected to the outer tube 2.

The bearing as shown and described hereinabove can conceivably be used in motor vehicles, more particularly, wheel suspensions, steering linkages, tie rod connections, and the like. Of course, other uses for the bearing in accordance with the present invention are possible and thus the list mentioned immediately above should not be considered exhaustive.

One feature of the invention resides broadly in the hydraulically damping rubber bearing, comprising an inner part, an outer tube located concentrically or eccentrically in relation to the inner tube and at some distance from it, and a rubber part inserted between them in which there is at least one chamber which is filled with damping fluid, characterized by the fact that outside the chamber 4 there is at least one elastic stop body 5 which extends radially between the inner part 1 and the outer tube 2, and is directly or indirectly connected to the outer tube 2.

Another feature of the invention resides broadly in the rubber bearing characterized by the fact that the stop body 5 is located on a ring-shaped component 6.

Yet another feature of the invention resides broadly in the rubber bearing characterized by the fact that the ring-shaped component 6 is held with or by means of its outside diameter inside the outer tube 2.

Still another feature of the invention resides broadly in the rubber bearing characterized by the fact that two stop bodies 5 are provided diametrically opposite one another.

A further feature of the invention resides broadly in the rubber bearing characterized by the fact that the ring-shaped component 6 is provided with at least one recess in the vicinity in which the stop body 5 is held in the stop body 5 seating area.

Another feature of the invention resides broadly in the rubber bearing characterized by the fact that the stop body 5 is made of elastic material.

Yet another feature of the invention resides broadly in the rubber bearing characterized by the fact that the stop body 5 is made of plastic or a material similar to plastic.

Examples of hydraulically damping bearings in which the present invention may possibly be utilized or which may possibly be adapted for use in the context of the present invention may be disclosed in the following U.S. Pat. Nos.: 4,893,799; 4,953,833; 4,958,811; 4,982,938; 5,048,803; 5,080,331; 5,181,698; 5,259,600; 5,305,991 and 5,492,310 and in U.S. patent application Ser. No. 08/826,562.

Examples of rubber or elastic bearings in which the present invention may possibly be utilized or which may possibly be adapted for use in the context of the present invention may be disclosed in the following U.S. Pat. Nos.: 5,340,094; 5,340,093; 5,318,283; 5,316,274; 5,271,678 and 5,205,545.

Examples of vulcanization processes which may possibly be utilized or adapted for use in the context of the present invention may be disclosed in the following U.S. Pat. Nos.: 5,332,787; 5,240,669; 5,238,643 and 5,210,152.

Examples of sealing by means of vulcanization and similar processes which may possibly be utilized or adapted for use in the context of the present invention may be disclosed in the following U.S. Pat. Nos.: 5,034,852; 4,943,070; 4,819,953; 4,075,755; and 4,746,130.

Examples of elastomers or elastic materials in which the present invention may be possibly utilized or which may be adapted for use in the context of the present invention may be disclosed in the following U.S. Pat. Nos.: 5,473,017; 5,472,782; 5,458,935; 5,451,640; 5,451,439; 5,436,295; 5,436,290; 5,416,146; 5,410,009; 5,397,832; 5,385,775; 5,169,706; 5,116,662; 5,114,781; and 4,981,747.

The components disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 196 40 531.9-12, filed on Oct. 1, 1996, having inventor Gerd Gab, and DE-OS 196 40 531.9-12 and DE-PS 196 40 531.9-12, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A motor vehicle hydraulically damping elastic shaft bearing, said hydraulically damping elastic shaft bearing comprising:

a first member;

said first member having a longitudinal axis;

said first member being configured to receive a shaft of a motor vehicle;

a second member;

said second member being configured to mount to a component of a motor vehicle;

said second member being disposed about said first member;

a third member;

said third member comprising an elastic material;

said elastic third member being disposed between said first member and said second member;

said elastic third member comprising at least one chamber;

said at least one chamber being configured to contain and containing a damping fluid;

at least one body being configured and disposed to limit and stop radial movement between said first member and said second member;

said at least one body being disposed outside of said at least one chamber so as to avoid contact with said damping fluid;

said at least one body being operatively connected to said second member;

said at least one body extending away from said second member and towards said first member in a substantially radial direction; and said at least one body being a separate part from and being distinct from and not elastomerically connected to said third member.

2. The hydraulically damping elastic shaft bearing according to claim 1, further comprising:

a fourth member;

said at least one body being disposed on said fourth member;

said fourth member being disposed within said second member;

said fourth member being substantially ring-shaped;

said fourth member comprising an outer surface;

said outer surface of said fourth member being configured and disposed to contact said second member to position said fourth member within said second member and to hold said fourth member relative to said second member;

said fourth member comprising at least one recess disposed therein;

said at least one body being disposed adjacent to said at least one recess;

said fourth member comprising at least one projection;

said at least one projection being configured and disposed to extend substantially parallel to said second member;

said at least one projection being configured to form at least a portion of said at least one recess in said fourth member;

at least a portion of said at least one body being disposed within said at least one recess; and said at least one body being connected to said at least one projection of said fourth member by one of a vulcanization process and an interlocking connection.

3. The hydraulically damping elastic shaft bearing according to claim 2, wherein:
said at least one body comprises two bodies;
said two bodies are disposed opposite to one another on said fourth member;
said two bodies each comprise one of an elastic material and a plastic material;
said at least one projection comprises one of the following:
a plastic material;
an elastic material;
a hard rubber material; and
a metallic material;
said first member has a substantially cylindrical shape;
said second member has a substantially cylindrical shape;
said second member is disposed concentric to said first member;
said second member is disposed a substantial distance from said first member;
said at least one chamber comprises a plurality of chambers;
said elastic third member comprises an arrangement to connect said plurality of chambers to permit damping fluid to flow between said plurality of chambers;
said elastic third member is rigidly connected to said first member; and
said elastic third member is operatively connected to said second member.

4. An hydraulically damping elastic bearing for a motor vehicle, said hydraulically damping elastic bearing comprising:
a first member;
said first member having a longitudinal axis;
said first member being configured to connect to a first portion of a motor vehicle;
a second member;
said second member being configured to mount to a second portion of a motor vehicle;
said second member being disposed about said first member;
an arrangement to dampen movement between said first member and said second member in a direction substantially perpendicular to the longitudinal axis;
said dampening arrangement being disposed between said first member and said second member;
said dampening arrangement comprising a third member;
said third member comprising an elastic material;
said elastic third member comprising at least one chamber;
said at least one chamber being configured to contain and containing a damping medium;
said dampening arrangement comprising at least one body;
said at least one body being disposed separate and apart from said third member so as to avoid contact with said damping fluid;
said at least one body being operatively connected to said second member;
said at least one body extending away from said second member and towards said first member in a substantially radial direction; and
said at least one body being a separate part from and being distinct from and not elastomerically connected to said third member.

5. The hydraulically damping elastic bearing according to claim 4, further comprising:
a fourth member;
said fourth member being disposed adjacent to said second member;
said at least one body being disposed on said fourth members
said fourth member being substantially ring-shaped;
said fourth member being disposed within said second member;
said fourth member comprising an outer surface; and
said outer surface of said fourth member being configured and disposed to contact said second member to position said fourth member within said second member and to hold said fourth member with respect to said second member.

6. The hydraulically damping elastic bearing according to claim 5, wherein said at least one body comprises one of an elastic material and a plastic material.

7. The hydraulically damping elastic bearing according to claim 6, wherein:
said fourth member comprises at least one recess disposed therein; and
said at least one body is disposed adjacent to said at least one recess.

8. The hydraulically damping elastic bearing according to claim 7, wherein:
said fourth member comprises at least one projection;
said at least one projection is configured and disposed to extend substantially parallel to said second member;
said at least one projection is configured to form at least a portion of said at least one recess in said fourth member;
at least a portion of said at least one body is disposed within said at least one recess;
said at least one body is connected to said at least one projection of said fourth member by one of a vulcanization process and an interlocking connection; and
said at least one projection comprises one of the following:
a plastic material;
an elastic material;
a hard rubber material; and
a metallic material.

9. The hydraulically damping elastic bearing according to claim 8, wherein said at least one body is disposed to move between a position a substantial distance from said first member and a position in contact with first member.

10. The hydraulically damping elastic bearing according to claim 9, wherein:
said at least one body comprises two bodies;
said two bodies are disposed opposite to one another on said fourth member;
said first member has a substantially cylindrical shape;
said second member has a substantially cylindrical shape;
said second member is disposed concentric to said first member;
said second member is disposed a substantial distance from said first member;
said at least one chamber comprises a plurality of chambers;
said elastic third member comprises an arrangement to connect said plurality of chambers to permit damping fluid to flow between said plurality of chambers;

said elastic third member is rigidly connected to said first member; and said elastic third member is operatively connected to said second member.

11. An hydraulically damping elastic bearing, said hydraulically damping elastic bearing comprising:

a first member;

said first member having a longitudinal axis;

a second member;

said second member being disposed about said first member;

a third member;

said third member comprising an elastic material;

said elastic third member being disposed between said first member and said second member;

said elastic third member comprising at least one chamber;

said at least one chamber being configured to contain and containing a damping fluid;

at least one body being configured and disposed to limit radial movement of said first member and said second member towards one another;

said at least one body being disposed outside of said at least one chamber so as to avoid contact with said damping fluid;

said at least one body being operatively connected to said second member;

said at least one body extending away from said second member and towards said first member in a substantially radial direction; and said at least one body being a separate part from and being distinct from and not elastomerically connected to said third member.

12. The hydraulically damping elastic bearing according to claim 11, further comprising:

a fourth member;

said fourth member being disposed adjacent to said second member;

said at least one body being disposed on said fourth member;

said fourth member being substantially ring-shaped;

said fourth member being disposed within said second member;

said fourth member comprising an outer surface; and said outer surface of said fourth member being configured and disposed to contact said second member to position said fourth member within said second member and to hold said fourth member with respect to said second member.

13. The hydraulically damping elastic bearing according to claim 12, wherein:

said at least one body comprises two bodies; and said two bodies are disposed opposite to one another on said second member.

14. The hydraulically damping elastic bearing according to claim 13, wherein each of said two bodies are connected to said fourth member by one of a vulcanization process and an interlocking connection.

15. The hydraulically damping elastic bearing according to claim 14, therein:

said fourth member comprises at least two projections;

each of said at least two projections are configured and disposed to extend substantially parallel to said second member; and each of said two bodies is connected to a corresponding one of said at least two projections.

16. The hydraulically damping elastic bearing according to claim 15, wherein:

each of said at least two projections comprises a recess disposed therein; and at least a portion of each of said two bodies is disposed within said recess of a corresponding one of said at least two projections.

17. The hydraulically damping elastic bearing according to claim 16, wherein each of said at least two projections comprises one of the following:

a plastic material;

an elastic material;

a hard rubber material; and a metallic material.

18. The hydraulically damping elastic bearing according to claim 17, wherein each of said two bodies comprise one of an elastic material and a plastic material.

19. The hydraulically damping elastic bearing according to claim 18, wherein:

said first member has a substantially cylindrical shape;

said second member has a substantially cylindrical shape;

said second member is disposed concentric to said first member;

said second member is disposed a substantial distance from said first member;

said fourth member is substantially ring-shaped;

said at least one chamber comprises a plurality of chambers;

said elastic third member comprises an arrangement to connect said plurality of chambers to permit damping medium to flow between said plurality of chambers;

said elastic third member is rigidly connected to said first member; and said elastic third member is operatively connected to said second member.

* * * * *

UNITED STATES PATENT AND TRADEMARK OFFICE
CERTIFICATE OF CORRECTION

PATENT NO.   : 6,029,960
DATED        : February 29, 2000
INVENTOR(S)  : Gerd GÄB It is certified that error appears in the above-indentified patent and that said Letters Patent is hereby corrected as shown below:

On the title page, item [57], line 4 under the ABSTRACT section, after 'inner', delete "tubes" and insert --tube.--.

In column 4, line 7, after 'portions', delete "protecting" and insert --projecting--.

In column 8, line 7, Claim 5, delete entire line 'members' and insert --member;--.

Signed and Sealed this

Twenty-seventh Day of March, 2001

Attest:

NICHOLAS P. GODICI

Attesting Officer

Acting Director of the United States Patent and Trademark Office